United States Patent
Mosteller (10) Patent No.: US 9,547,814 B2
(45) Date of Patent: *Jan. 17, 2017

(54) MULTI-METAL LAYERED CARD

(71) Applicant: CPI Card Group-Colorado, Inc., Littleton, CO (US)

(72) Inventor: Barry Mosteller, Castle Pines, CO (US)

(73) Assignee: CPI Card Group—Colorado, Inc., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,384

(22) Filed: Jun. 26, 2015

(65) Prior Publication Data

US 2016/0004944 A1    Jan. 7, 2016

Related U.S. Application Data

(63) Continuation of application No. 14/522,198, filed on Oct. 23, 2014, now Pat. No. 9,070,053.

(60) Provisional application No. 61/895,915, filed on Oct. 25, 2013.

(51) Int. Cl.
| | |
|---|---|
| *G06K 19/02* | (2006.01) |
| *B23K 26/36* | (2014.01) |
| *B32B 37/12* | (2006.01) |
| *B32B 37/18* | (2006.01) |
| *C25D 11/02* | (2006.01) |
| *C25D 11/14* | (2006.01) |
| *C25D 11/26* | (2006.01) |
| *C25D 11/34* | (2006.01) |

(52) U.S. Cl.
CPC .......... *G06K 19/022* (2013.01); *B23K 26/362* (2013.01); *B32B 37/12* (2013.01); *B32B 37/18* (2013.01); *C25D 11/022* (2013.01); *C25D 11/14* (2013.01); *C25D 11/26* (2013.01); *C25D 11/34* (2013.01); *G06K 19/02* (2013.01); *B32B 2307/208* (2013.01); *B32B 2310/0843* (2013.01); *B32B 2311/00* (2013.01); *B32B 2425/00* (2013.01)

(58) Field of Classification Search
CPC ..... B42D 15/10; G07F 7/1008; G06K 19/077; G06K 19/007
USPC .................................................. 235/488, 487
See application file for complete search history.

(56) References Cited

U.S. PATENT DOCUMENTS

| | | |
|---|---|---|
| 3,688,088 A | 8/1972 | Brown et al. |
| 3,855,033 A | 12/1974 | Staats |
| 3,896,726 A | 7/1975 | Staats |
| 3,949,501 A | 4/1976 | Andrews et al. |
| 4,097,279 A | 6/1978 | Whitehead et al. |
| 4,223,918 A | 9/1980 | Smoczynski |

(Continued)

*Primary Examiner* — Karl D Frech
(74) *Attorney, Agent, or Firm* — Marsh Fischmann & Breyfogle LLP (57) ABSTRACT

A metal transaction card is provided having a metal core layer with metal cladding layers connected thereto on opposing sides thereof. The metal core layer may have a density and/or thickness that is significantly greater than the density and/or thickness of the metal cladding layers. The density of the metal core layer may be at least 2.5 times greater than the density of the metal cladding layers. The density of the metal core layer may be at least 7.5. The outward facing lateral surface of one or both of the metal cladding layers may be anodized, or anodized and colorized. The anodized lateral surface(s) may be coated to increase the performance of a one or more hot-stamped elements attached to the coated surface(s).

20 Claims, 5 Drawing Sheets

(56) References Cited

U.S. PATENT DOCUMENTS

| | | |
|---|---|---|
| 4,568,824 A | 2/1986 | Gareis et al. |
| 4,592,976 A | 6/1986 | Whitehead |
| 4,677,285 A | 6/1987 | Taniguchi |
| 4,746,392 A | 5/1988 | Hoppe |
| 4,897,533 A | 1/1990 | Lyszczarz |
| 4,931,629 A | 6/1990 | Frankfurt |
| 5,215,792 A | 6/1993 | Miller |
| 5,513,019 A | 4/1996 | Cueli |
| 5,559,370 A | 9/1996 | Berney |
| 5,667,876 A | 9/1997 | Radlicz |
| 5,690,773 A | 11/1997 | Fidalgo et al. |
| 5,877,941 A | 3/1999 | Ryu |
| 5,965,867 A | 10/1999 | Haghiri-Tehrani |
| 6,006,456 A | 12/1999 | Hiromachi et al. |
| 6,025,283 A | 2/2000 | Roberts |
| 6,164,548 A | 12/2000 | Curiel |
| 6,202,931 B1 | 3/2001 | Billebaud |
| 6,239,976 B1 | 5/2001 | Templeton et al. |
| 6,352,604 B2 | 3/2002 | Droz |
| 6,644,552 B1 | 11/2003 | Herslow |
| 6,942,156 B2 | 9/2005 | Ohta et al. |
| 6,986,467 B2 | 1/2006 | Takahashi et al. |
| 7,269,021 B2 | 9/2007 | Gundlach et al. |
| 7,287,704 B2 | 10/2007 | Herslow |
| 7,306,163 B2 | 12/2007 | Scholz et al. |
| 7,398,917 B2 | 7/2008 | Albazov et al. |
| 7,413,128 B2 | 8/2008 | Waldo et al. |
| 7,494,057 B2 | 2/2009 | Lasch et al. |
| 7,503,503 B2 | 3/2009 | Riedl et al. |
| 7,530,491 B2 | 5/2009 | Lasch et al. |
| 7,588,184 B2 | 9/2009 | Gandel et al. |
| 7,819,310 B2 | 10/2010 | Lasch et al. |
| 7,823,777 B2 | 11/2010 | Varga et al. |
| 7,971,786 B2 | 7/2011 | Lasch et al. |
| 8,033,457 B2 | 10/2011 | Varga et al. |
| 8,061,618 B2 | 11/2011 | Mosteller |
| 8,079,514 B2 | 12/2011 | Lasch et al. |
| 8,186,582 B2 | 5/2012 | Varga et al. |
| 8,305,764 B2 | 11/2012 | Rietzler |
| 8,413,894 B2 | 4/2013 | Bona et al. |
| 8,434,675 B2 | 5/2013 | Faith |
| 8,594,730 B2 | 11/2013 | Bona et al. |
| 8,672,232 B2 | 3/2014 | Herslow |
| 8,857,722 B2 | 10/2014 | Mosteller |
| 9,070,053 B2 * | 6/2015 | Mosteller ............... G06K 19/02 |
| 2002/0070279 A1 | 6/2002 | Zausner |
| 2004/0011877 A1 | 1/2004 | Reppermund |
| 2005/0230822 A1 | 10/2005 | Tran |
| 2006/0124753 A1 | 6/2006 | Scholz et al. |
| 2007/0089831 A1 | 4/2007 | Florentino et al. |
| 2009/0169776 A1 | 7/2009 | Herslow |
| 2011/0020606 A1 | 1/2011 | Herslow et al. |
| 2011/0031319 A1 | 2/2011 | Kiekhaefer et al. |
| 2011/0073660 A1 | 3/2011 | Lawyer |
| 2011/0108629 A1 | 5/2011 | Mueller-Hipper et al. |
| 2011/0140841 A1 | 6/2011 | Bona et al. |
| 2011/0189620 A1 | 8/2011 | Herslow |
| 2012/0204419 A1 | 8/2012 | Varga et al. |
| 2012/0313754 A1 | 12/2012 | Bona |
| 2013/0228628 A1 | 9/2013 | Bona et al. |
| 2013/0255078 A1 | 10/2013 | Cox |
| 2013/0255848 A1 | 10/2013 | Cox |
| 2013/0258622 A1 | 10/2013 | Cox |
| 2013/0260065 A1 | 10/2013 | Cox |
| 2013/0261262 A1 | 10/2013 | Cox |
| 2014/0052630 A1 | 2/2014 | Bona et al. |

* cited by examiner

MULTI-METAL LAYERED CARD

RELATED APPLICATIONS

This application is a continuation of U.S. patent application Ser. No. 14/522,198 filed on Oct. 23, 2014, entitled "MULTI-METAL LAYERED CARE," which claims priority to U.S. Provisional Patent Application No. 61/895,915 filed Oct. 25, 2013, entitled "MULTI-METAL LAYERED CARD," which are incorporated herein by reference in its entirety.

BACKGROUND OF THE INVENTION

The prevalence of the use of transaction cards continues to grow. With the increasing use of transaction cards by individuals for value in purchases, the market for different types of transaction cards also continues to grow.

In this regard, a number of different varieties of cards are offered to consumers that may each offer a unique set of benefits and features. For example, a number of ultra-premium transaction card types have been proposed that are marketed to individuals with high net worth that also establish large balances using a transaction card. Card issuers that offer such ultra-premium transaction card types often provide associated premium services to holders of such ultra-premium transaction cards such as, for example, concierge services, increased involvement rewards programs, increased travel benefits, consumer protection features with respect items purchased using such cards, or other ultra-premium services not typically offered with standard transaction cards.

In addition to ultra-premium services offered in connection with such transaction cards, card issuers may also wish to provide a premium physical card as evidence of the ultra-premium nature of the transaction card. In fact, the awareness of such ultra-premium transaction cards has grown to the point where such ultra-premium cards have become associated with the high net worth individuals to whom such cards are issued. In this regard, such ultra-premium cards have become status symbols for many individuals.

To further increase the exclusivity of such cards and to differentiate such cards from traditional transaction cards, it has been proposed to manufacture cards using different precious metals rather than the typical plastic materials employed in traditional cards. For example, titanium, palladium, other precious metals, or the like have been proposed to be used to construct ultra-premium transaction cards. However, to produce precious metal cards of the kind proposed for use in the ultra-premium transaction card market, it is often the case that traditional methods of card manufacture are not applicable. In turn, the cost of such cards is often much greater than the cost associated with the production of traditional transaction cards made from plastics and the like.

SUMMARY OF THE INVENTION

The present invention is directed to metal cards that offer premium weight and appearance characteristics, while also providing economical production advantages.

In one embodiment, a transaction card (e.g., a credit card, debit card, stored value card, gift card, membership card, or loyalty card) includes a metal core layer having a density of at least a first value, a first metal cladding layer connected to a first lateral side of the metal core layer, and a second metal cladding layer connected to a second side of the metal core layer, opposite to said the first side, wherein the first and second metal cladding layers each have densities that are no greater than a second density value. Further, the transaction card may include a visible indicium indicative of an account associated with the transaction card. In currently contemplated implementations, the metal core layer and each of the first and second metal cladding layers extend laterally across an entire length and an entire width of the transaction card in parallel co-relation to one another. Advantageously, the first density value may be at least 2.5 times greater, and in some embodiments at least five times greater, than the second density value. Such a differential between the first density value and second density value facilitates realization of a transaction card that has a relatively high weight and that may be desirably durable and/or decorated, and that may be economically produced.

In some embodiments, a metal core layer may be provided that has a total weight that is at least 50% of a total weight of the transaction card. In certain implementations, the total weight of the metal core layer may be at least 70%, and in some embodiments at least 90%, of the total weight of the transaction card.

In various embodiments, a metal core layer may be employed that has a density of at least 7.0 $g/cm^3$. In some implementations, the density of the metal core layer may be at least 16 $g/cm^3$.

In conjunction with one or more of the noted embodiments (e.g., cards having length, width, and thickness dimensions compliant with the ID-1 format under ISO 7810 standard), a transaction card may be readily provided that has a total weight of at least 15 grams, and preferably at least 24 grams. In certain such arrangements, the transaction card may have a total weight of at least 35 grams, and in other such arrangements at least 50 grams.

In one or more of the noted embodiments, a transaction card may be provided having a total thickness across a metal core layer, a first metal cladding layer, a second metal cladding layer, and a coating on a visible lateral surface of the first metal cladding layer and/or metal cladding layer, wherein the metal core layer defines at least 30% of the total thickness, and the first metal cladding layer and the second metal cladding layer combinatively define no more than 70% of the total thickness. In currently contemplated embodiments, the metal core layer may define at least 60% of the total thickness, and the first metal cladding layer and second metal cladding layer may combinatively define no greater than 40% of the total thickness. In certain arrangements, the metal core layer may define at least 90% of the total thickness, and the first metal cladding layer and the second metal cladding layer combinatively define no more than 10% of the total thickness.

In some implementations, the metal core layer may comprise a metal from the following group: tungsten (e.g., recognized density of 19.3 $g/cm^3$), stainless steel (e.g., recognized density of 7.5 to 8.1 $g/cm^3$), copper (e.g., recognized density of 9.0 $g/cm^3$), silver (e.g., recognized density of 10.5 $g/cm^3$), gold (e.g., recognized density of 19.3 $g/cm^3$), or alloys comprising one or more of such metals (e.g., alloys having a density of at least 7 $g/cm^3$). In currently contemplated economical embodiments, the metal core layer may comprise a tungsten alloy (e.g., comprising at least 90% tungsten by volume) or stainless steel.

In conjunction with one or more of the noted embodiments, the first metal cladding layer and/or second metal cladding layer may comprise an anodizedable metal, such as at least one metal from the following group: aluminum (e.g., recognized density of 2.7 g/cm$^3$), titanium (e.g., recognized density of 4.5 g/cm$^3$), zinc (e.g., recognized density of 7.1 g/cm$^3$), niobium (e.g., recognized density of 8.6 g/cm$^3$), or tantalum (e.g., recognized density of 16.4 g/cm$^3$), or alloys comprising one or more of such metals. In currently contemplated economical embodiments, the anodizeable cladding layer and/or second cladding layer may consist entirely of aluminum and/or aluminum alloys.

In another embodiment, a transaction card includes a metal core layer, a first metal cladding layer connected to a first lateral side of the metal core layer, and a second metal cladding layer connected to a second lateral side of the metal core layer, opposite to the first side. In such embodiments, at least one of the first and second metal cladding layers comprises a visible (e.g., outward facing), anodized lateral surface (e.g., visible as part of a finished transaction card). Further, the transaction card may include a visible indicium indicative of an account associated with the transaction card. In currently contemplated implementations, the metal core layer and each of the first and second metal cladding layers extend laterally across an entire length and an entire width of the transaction card in parallel co-relation to one another. Advantageously, both the first and second metal cladding layers may comprise a corresponding visible (e.g., outward facing), anodized lateral surface (e.g., visible as part of a finished transaction card).

In some implementations, an anodized, outward facing lateral surface of the first cladding layer and/or of the second metal cladding layer may be colorized to provide one or more visible, decorative features. Such colorization may be provided during anodization of or subsequent to anodization of the anodized lateral surface(s).

Optionally, a transaction card may be provided so that all visible, side edge surfaces of a first metal cladding layer and/or second metal cladding layer may be anodized (e.g. visible as part of a finished transaction card). In turn, such visible, anodized side edge surfaces may be colorized (e.g., colorized together with a corresponding lateral surface). In some embodiments, all visible, side edge surfaces of the metal core layer may be anodized. Again, such side edge surfaces may be colorized.

In various embodiments, a transaction card may be provided wherein first and second metal cladding layers comprise visible side edge surfaces that are visually differentiateable from visible side edges of a metal core layer. In turn, card uniqueness may be further enhanced.

In conjunction with one or more of the noted embodiments, an outward facing lateral surface of the first cladding layer and/or second metal cladding layer, whether anodized or non-anodized, may be coated with a liquid coating selected to promote the durable attachment thereto of one or more of the following card elements: a machine readable element (e.g., a magnetic stripe, a bar code element (e.g., 1 or 2 dimensional), a bokode element, etc.), a card holder signature panel, a hologram element, and a decorative element. By way of primary example, the coating may be selected to promote durable attachment of one or more of such elements by a hot stamp process.

In embodiments in which an outward facing lateral surface of the first metal cladding layer and/or a second metal cladding layer is anodized and colorized the coating may be translucent or transparent so that the anodized, colorized surface(s) are visible (e.g., a finished transaction card). In some implementations, the coating may comprise at least one of the following: a water-based clear coating, a UV-curable clear coating, and a solvent-based clear coating.

In conjunction with embodiments in which a visible, lateral surface of at least one of the first metal cladding layer and second metal cladding layer is anodized, account indicium may be defined by removal of a portion of the anodized, lateral surface (e.g., by laser etched removal). In other embodiments, account indicium may be provided by printing on the outward facing side of one or both lateral surfaces.

In another embodiment, a method is provided for producing a metal transaction card that includes connecting a first metal cladding layer and a second metal cladding layer to opposing sides of a metal core layer to form a metal-clad core having outward-facing lateral surfaces on opposing sides thereof. The metal may further include defining visible indicium indicative of an account associated with the transaction card on one side of the metal-clad core (e.g., after the connecting step).

In some implementations, the method may further include the step of anodizing at least one of the outward-facing lateral surfaces of the metal-clad core after the connecting step to define an anodized lateral surface(s). Further, the method may include the step of coating the anodized lateral surface(s) to define a coated, anodized lateral surface(s). Additionally, the method may include the step of attaching a card element to the coated, anodized lateral surface(s). By way of example, the attaching step may include hot-stamping the at least one card element directly to the coated, anodized lateral surface.

In embodiments wherein a coating is utilized, the coating may be light transmissive. For example, the coating may be applied to provide a coating layer that is translucent or transparent.

In one batch implementation, the connecting, anodizing, coating, and attaching steps may be completed for each of a plurality of transaction cards. In such batch implementation, the method may include the steps of interconnecting a first metal cladding sheet and a second metal cladding sheet to opposing sides of a metal core sheet to form a metal-clad core assembly, and thereby complete the connecting step for each of the plurality of transaction cards. In turn, the batch implementation may include the step of separating the metal-clad core assembly into a plurality of metal-clad cores in corresponding relation to the plurality of transaction cards.

In one approach, for each of the plurality of transaction cards, the anodizing step may be completed before the separating step, wherein side edge surfaces of the first and second metal cladding layers are non-anodized. In another approach, for each of the plurality of transaction cards, the anodizing step may be completed after the separating step, where side edge surfaces of at least one or both of the first and second metal cladding layers may be anodized and optionally colorized.

In conjunction with various method embodiments, one or more of the features described above in relation to the various transaction card embodiments may be included. By way of primary example, a metal core layer may be provided having a density that is at least 2.5 times greater and in some implementations at least five times greater, than the densities of the first metal cladding layer and the second metal cladding layer.

Numerous additional features and advantages of the present invention will become apparent to those skilled in the art upon consideration of the embodiment descriptions provided hereinbelow.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

The present disclosure generally relates to cladded metal cards and method for manufacturing the same, and in particular to cladded metal transaction cards that may be used for value in purchases and methods for manufacturing such cladded metal transaction cards. Specifically, the present disclosure includes cards that include a metal core and at least one metal cladding layer connected thereto. More particularly, a metal core may have anodizeable metal cladding layers connected to opposing sides. By way of example, the metal core layer may comprise tungsten, stainless steel, palladium, platinum, gold, silver, or alloys comprising one or more of such metals, and the metal cladding layer(s) may comprise aluminum or an aluminum alloy. Tungsten, a tungsten alloy, or stainless steel may be preferred for the metal core layer because such metals have a combination of advantageous properties, including high density, relatively good workability, non-toxicity and relatively low cost.

Figure 1:
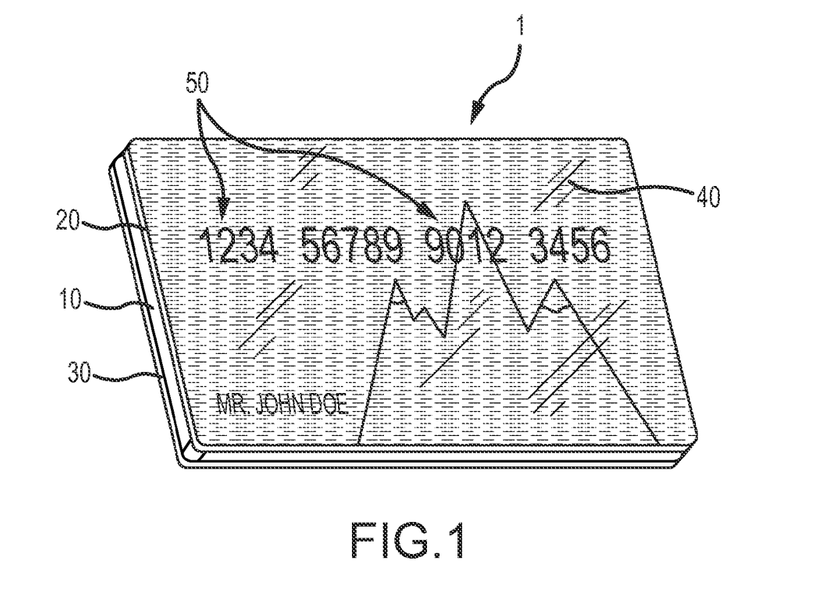
FIG. 1 is a perspective front view of a transaction card embodiment.
Figure 2:
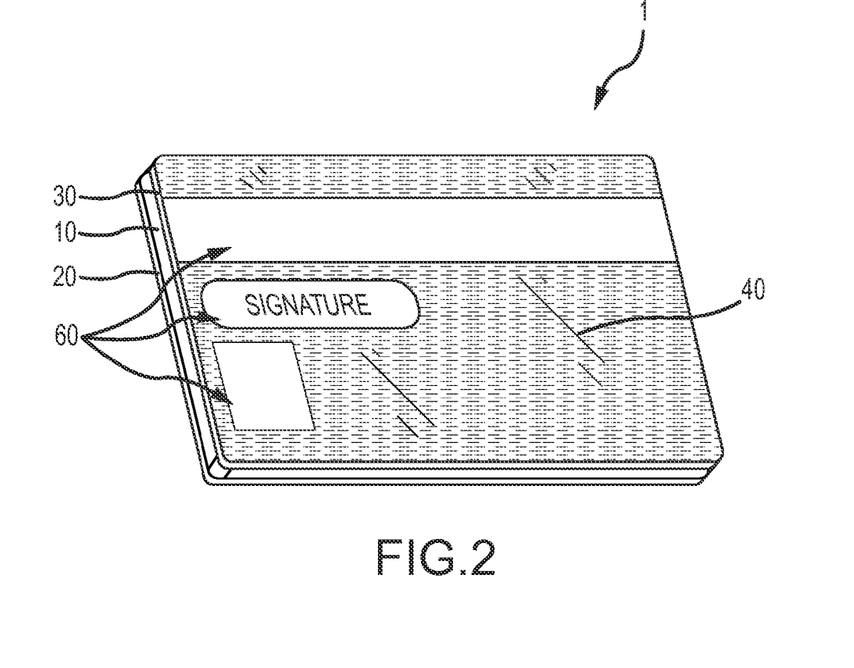
FIG. 2 is a perspective rear view of the transaction card embodiment of FIG. 1.

FIGS. 1 and 2 illustrate one embodiment of a transaction card 1 (e.g., a finished transaction card) comprising a metal core layer 10, and a first metal cladding layer 20 and second metal cladding layer 30 connected thereto. In the illustrated embodiment, the metal core layer 10 and each of the first and second metal cladding layers 20, 30 extend laterally across an entire length and an entire width of the transaction card 1, in parallel correlation to one another. As will be further described, an outward facing lateral surface of the first metal cladding layer 20 and an outward facing lateral surface of the second metal cladding layer 30 may each be coated with at least one coating 40 (e.g., a transparent coating). As shown in FIG. 1, indicium 50 indicative of an account associated with the transaction card 1 may be provided on an outward facing side lateral surface of the first metal cladding layer 20. Further, and as shown by FIG. 2, one or more card elements 60 may be provided on an outward facing side of the second metal cladding layer 30.

Figure 3:
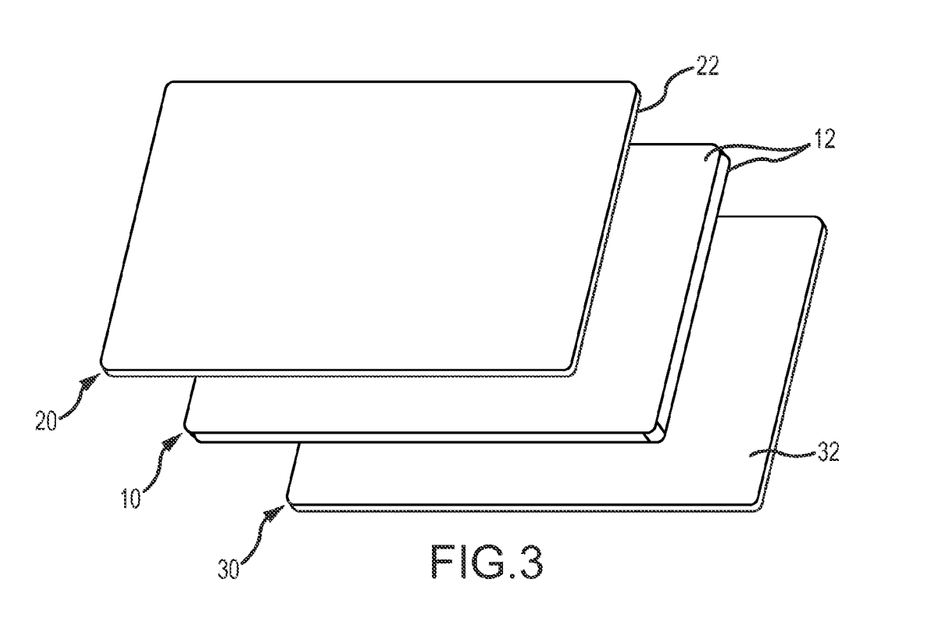
FIG. 3 is an exploded, front perspective view of a metal core layer, a first metal cladding layer, and a second metal cladding layer of the transaction card embodiment of FIG. 1.

Referring now to FIGS. 3-10, transaction card 1 and a corresponding production embodiment will be further described. In FIG. 3 the metal core layer 10, first metal cladding layer 20, and second metal cladding layer 30 are shown oriented in position for connection therebetween. The metal core layer 10 may be of a density and/or thickness that is greater than that of the first metal cladding layer 20 and second metal cladding layer 30. By way of example, the metal core layer 10 may be of a density that is at least 2.5 times greater than the densities of the first metal cladding layer 20 and the second metal cladding layer 30.

In some embodiments, metal core layer 10 may be provided to have a density of at least 7 g/cm$^3$, and preferably at least 7.5 g/cm$^3$ (e.g., a metal core layer comprising a tungsten alloy or stainless steel). In some implementations, the metal core layer 10 may be employed having a density of at least 16 g/cm (a metal core layer comprising a tungsten alloy). In conjunction with such embodiments, the first metal cladding layer 20 and/or second metal cladding layer 30 may comprise a metal having a relatively low density compared to that of metal core layer 10.

Figure 4:
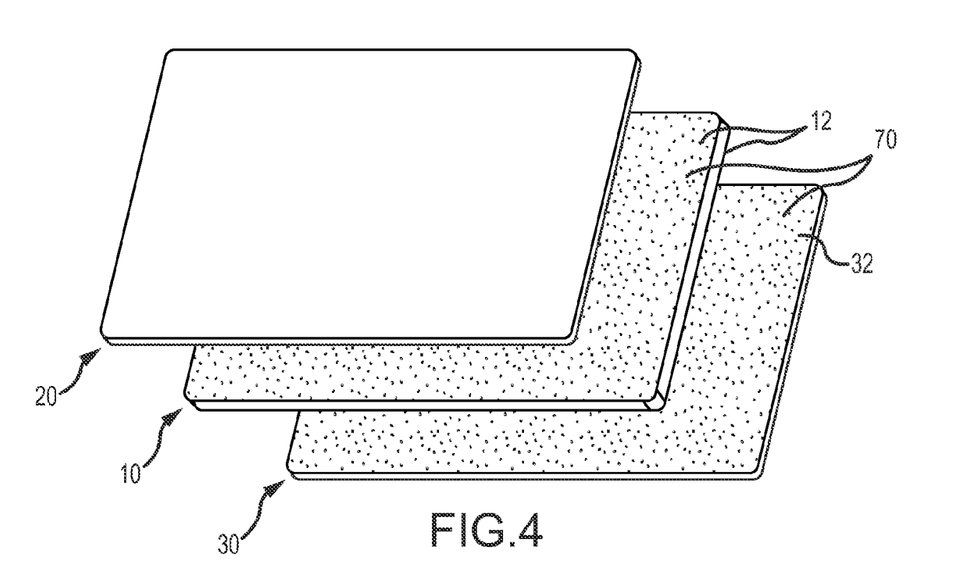
FIG. 4 is an exploded, front perspective view of a metal core layer, a first metal cladding layer, and a second metal cladding layer of the transaction card embodiment of FIG. 1, with an adhesive applied to one or more lateral surfaces.

As shown in FIG. 4, to connect the metal core layer 10, first metal cladding layer 20, and second metal cladding layer 30, an adhesive 70 may be applied to the outward facing lateral surface(s) 12 of the metal core layer 10 and/or to the inward facing lateral surface 22, of the first metal cladding layer 20 and/or the inward facing lateral surface 32 of the second metal cladding layer 30. By way of example, adhesive 70 may comprise: cynoacrilid adhesives or epoxies. In other embodiments, the metal core layer 10, first metal cladding layer 20, and second metal layer 30 may be connected by another technique, including silver solder, thermal pressure bond (see, e.g., U.S. Pat. No. 3,683,488), brazing, or electron precise bonding.

Figure 5:
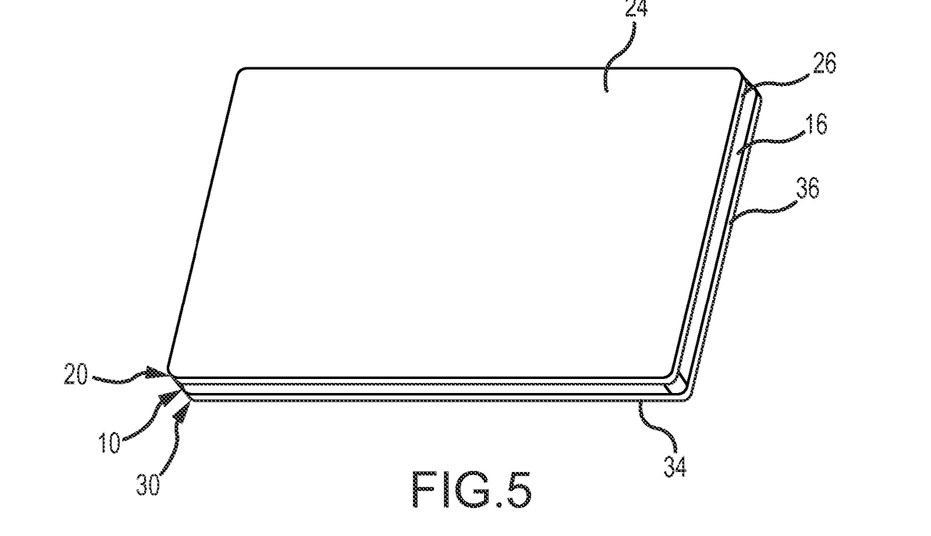
FIG. 5 is a front perspective view of a connected metal core layer, first metal cladding layer, and second metal cladding layer of the transaction card embodiment of FIG. 1.

After connection of the metal core layer 10, first metal cladding layer 20, and second metal cladding layer 30, as shown in FIG. 5, exposed portions of the interconnected metal layers may be subjected to an anodization process. Such anodization may provide increased surface hardness, increased corrosion resistance and increased surface adhesion abilities, and may also advantageously facilitate colorization. The anodization process may entail one or a plurality of anodization steps (e.g., one or more anodization step in which surface colorization is realized, and another anodization step in which the colorized, anodized surface is stabilized).

Figure 6:
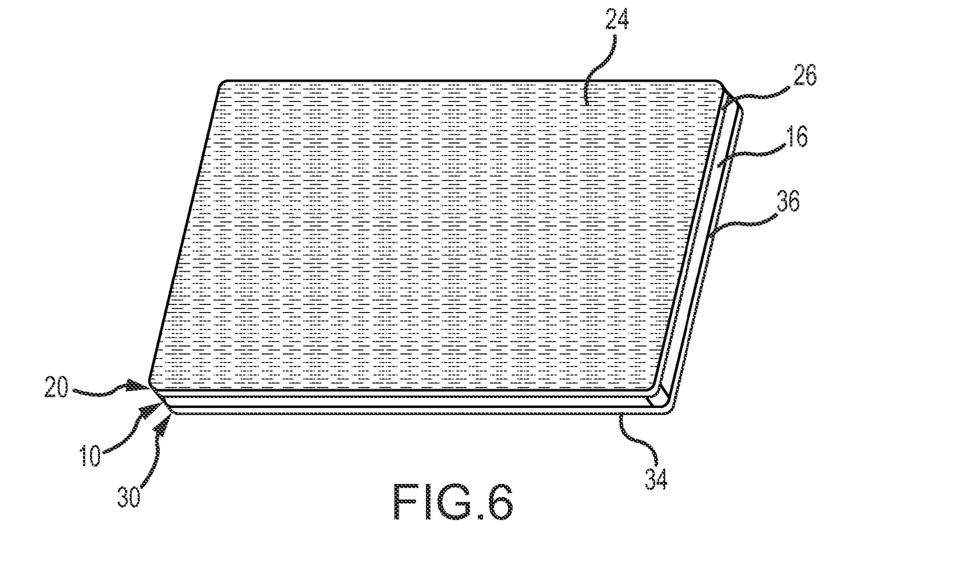
FIG. 6 is a perspective front view of a connected metal core layer, first metal cladding layer, second metal cladding layer of the transaction card embodiment of FIG. 1, with one or more outward facing lateral surface of the first metal cladding layer or second metal cladding layer being anodized.

As shown in FIG. 6, an outward facing lateral surface 24 of the first metal cladding layer 20 may be anodized, and/or an outward facing lateral surface 34 of the second metal cladding layer 30 may be anodized. In some embodiments, side edge surfaces 26 of the first metal cladding layer 20, and side edge surfaces 36 of the second metal cladding layer 30 may be anodized. Further, depending on whether the metal utilized in metal core layer 10 is anodizeable, side edge surfaces 16 of the metal core layer may also be anodized.

In one production approach, the metal core layer 10, first metal cladding layer 20 and second metal cladding layer 30 for a plurality transaction cards 1 may be defined by connecting a metal core sheet, a first metal cladding sheet, and a second metal cladding sheet, anodizing the assembly of connected metal sheets, and subsequently separating (e.g., machining out with EDM wire cutting) the assembly into a plurality of card subassemblies. In such approach, the exposed side edge surfaces of the metal core layer, first metal cladding layer and second metal cladding layer of each subassembly, may not be anodized. In another production approach, the assembly of connected metal sheets may be separated into subassemblies that are then anodized to yield anodized exposed side edge surfaces on the first metal cladding layer, second metal cladding layer and/or metal core layer.

Figure 7:
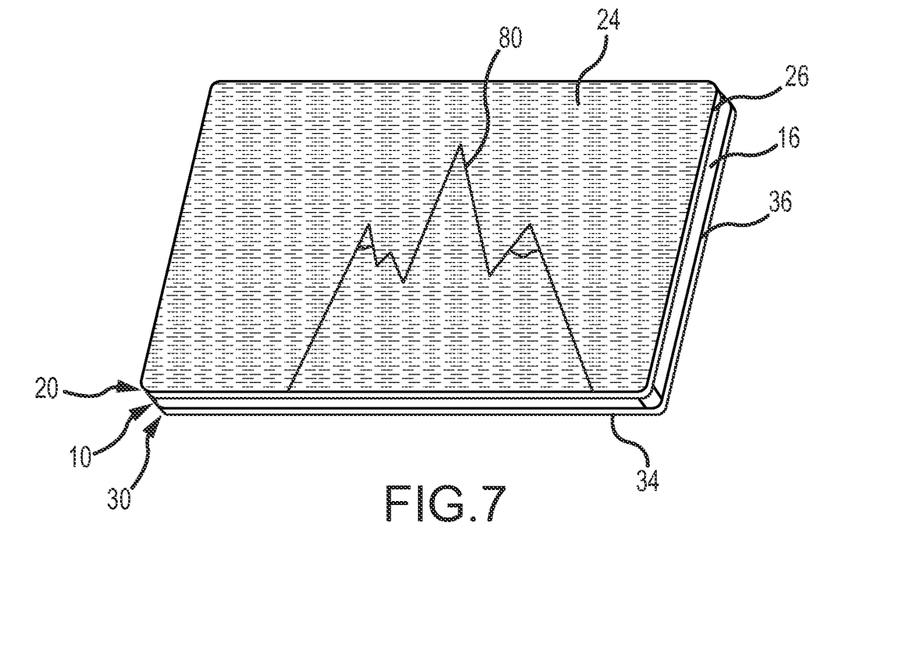
FIG. 7 is a perspective front view of a connected metal core layer, first metal cladding layer, second metal cladding layer of the transaction card embodiment of FIG. 1, with one or more outward facing lateral surface of the first metal cladding layer or second metal cladding layer being anodized and colorized.

In any case, side edge surfaces of the first metal cladding layer 20 and second metal cladding layer 30 may be visually discernible from side edge surfaces of the metal core layer 10. For example, the first and second metal cladding layers 20, 30 may be desirably colorized relative to side edge surfaces of the metal card layer 10. The anodized outward facing lateral surface 24 of the first metal cladding layer 20 and/or the anodized outward facing lateral surface 34 of the second metal cladding layer 30 may be desirably colorized to provide one or more decorative features 80, as shown in FIG. 7. In one approach, one or more colorization dyes may be utilized in conjunction with anodization of the anodized, lateral surface(s) 24, 34. In another approach, one or more dyes may be applied to the lateral surface(s) 24, 34 after anodization.

Figure 8:
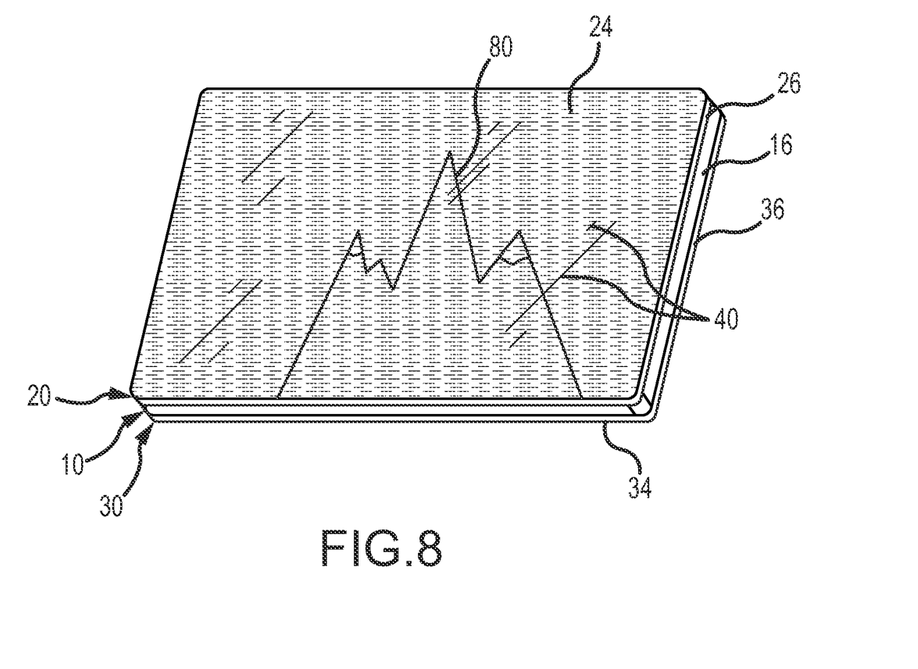
FIG. 8 is a perspective front view of a connected metal core layer, first metal cladding layer, second metal cladding layer of the transaction card embodiment of FIG. 1, with one or more outward facing lateral surface of the first metal cladding layer or second metal cladding layer being anodized, colorized, and having a coating applied thereto.

As shown in FIG. 8, a coating 40 may be applied to at least the outward facing side of the first metal cladding layer 20 and/or the outward facing side of the second metal cladding layer 30. Advantageously, such coating may be light-transmissive. For example, the coating 40 may be transparent or translucent so that decorative features (e.g., as defined by colorization of the anodized surfaces), may be visible in a finished transaction card. Further, the coating may be selected to facilitate durable attachment of card elements 60 thereto. By way of example, the coating 40 may comprise one of the following materials: A water-based clear coating (e.g., Wink 3350 RP designed for Gravure and roll coating, available from FM Group, Inc. of Congers, N.Y., USA), a UV-curable clear coating (e.g., MinusNine 5662 designed for roll coating, available from MinusNine Technologies, Inc. of Birdsburo, Pa., USA), and a solvent-based clear coating (e.g., Sericol SSA-MMX designed for silk screen press application, available from Fuji Film North America Corporation, Graphic Systems Division, Kans. City, Kans., USA).

In some embodiments, the coating 40 may cover the entirety of the card (e.g., at a thickness of <0.0005"). In turn, the coating 40 may function to seal the card.

Figure 9:
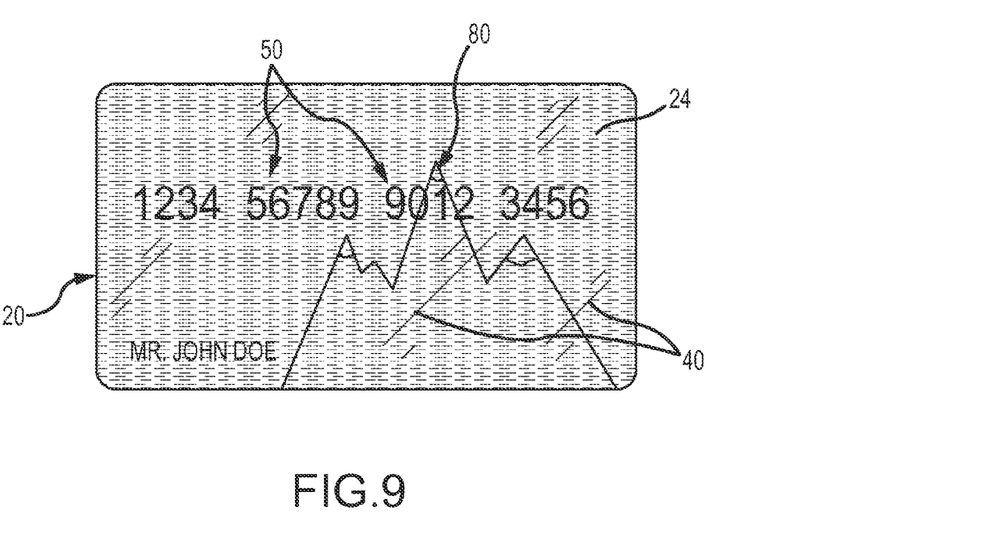
FIG. 9 is a front view of the transaction card embodiment of FIG. 1 with account indicium defined on an outward facing side of a first metal cladding layer.

Referring now to FIG. 9, the outward facing side of the first metal cladding layer 20 is shown with indicium 50 defined thereupon. By way of example, indicium 50 may include numeric alphanumeric or other account identifier. Further, for some applications, a card holder name and additional account specific data may be presented. In one approach, the indicium 50 may be defined by removing a portion of an anodized lateral surface 24 of the first metal cladding layer 20 or a portion of an anodized lateral surface 34 of the second metal cladding layer 30 (e.g., laser etching or another etching technique). In another approach, the indicium 50 may be defined by printing, including for example, drop-on-demand ink jet printing using durable inksets.

Figure 10:
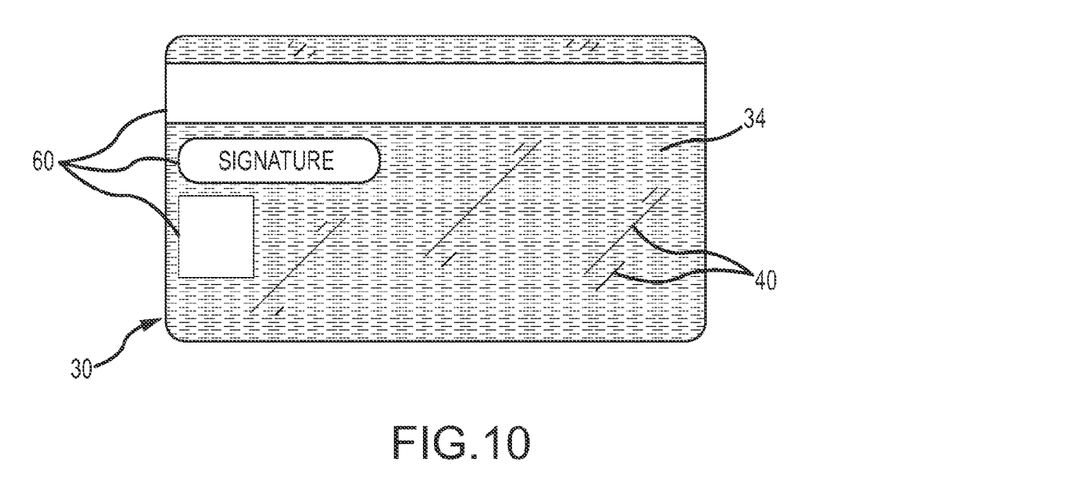
FIG. 10 is a rear view of the transaction card embodiment of FIG. 1 with card elements being attached to an outward facing side of a second metal cladding layer.

As illustrated in FIG. 10, the outward facing side of the second metal cladding layer 30 is shown with a plurality of card elements 60 attached thereto. Such card elements 60 may comprise a machine readable element (e.g., a magnetic stripe, a bar code element (e.g., one dimensional or two dimensional), or bokode element), a card-holder signature panel, and/or a hologram element or a decorative element. In one approach, one or more of the card elements 60 may be applied by a hot-stamping process. In conjunction with such approach, the attachment durability of one or more card hot-stamped elements 60 may be enhanced by the utilization of coating 40, as indicated above.

In various embodiments, transaction card 1 may be provided in compliance with certain ISO 7810, ISO 7811, and ISO 7813 requirements, including length, width, and thickness dimension requirements for an ID-1 format card, required issuer/bearer identification information, magnetic stripe requirements for a financial card, and card surface finish requirements.

For example, in various embodiments transaction card 1 may be provided to have a thickness of between 27 mils and 33 mils, preferably between 30 mils and 32 mils. In at least some of such embodiments, transaction card 1 may be provided to have a nominal length and nominal width of 85.6 mm and 53.98 mm, respectively. In contemplated embodiments of transaction card 1, the metal core layer 10 may have a thickness between 10 mils and 32 mils and first metal cladding layer 20 and second metal cladding layer 30 may each have a thickness of between 0.5 mils and 10 mils. In embodiments that have a metal cladding layer having a thickness of more than 1 mils, such layer may be handled as a separate component in positioning and connecting such layer to metal core layer 10. To achieve a metal cladding layer having a thicknesses of 1 mil or less, electroplating and other plating processes may be utilized.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A method for producing a transaction card, comprising:
connecting a first metal cladding layer and a second metal cladding layer to opposing sides of a metal core layer to form a metal-clad core having outward-facing, lateral surfaces on opposing sides thereof, wherein the metal core layer has a first density value, wherein the first metal cladding layer and the second metal cladding layer each have densities no greater than a second density value, and wherein said first density value is at least 2.5 times greater than said second density value; and, defining visible indicium indicative of an account associated with the transaction card after said connecting step, said visible indicium being on one side of said metal-clad core.

2. A method according to claim 1, further comprising:
anodizing at least one of said outward-facing lateral surfaces of said metal-clad core after said connecting step to define an anodized lateral surface.

3. A method according to claim 2, further comprising:
coating said anodized lateral surface to define a coated, anodized lateral surface.

4. A method according to claim 3, further comprising:
attaching a card element to the coated, anodized lateral surface.

5. A method according to claim 4, said attaching step comprising:
hot-stamping said at least one card element directly to said coated, anodized lateral surface.

6. A method according to claim 5, wherein said hot-stamped element comprises at least one of a machine readable element, a card holder signature panel, a hologram element, and a decorative element.

7. A method according to claim 3, wherein said coating is light transmissive.

8. A method according to claim 3, wherein said transaction card has a total thickness across said metal core layer, first metal cladding layer, second metal cladding layer and coating, and wherein said metal core layer defines at least 30% of said total thickness, and said first metal cladding layer and said second metal cladding layer combinatively define no greater than 70% of said total thickness.

9. A method according to claim 2, said defining step comprising:
laser etched removal of a portion of the anodized, lateral surface of said at least one of said first and second metal cladding layers.

10. A method according to claim 1, further comprising:
anodizing at least one of said outward-facing lateral surfaces of said metal-clad core after said connecting steps to define an anodized lateral surface;
coating said anodized lateral surface to define a coated, anodized lateral surface; and,
attaching a card element to the coated, anodized lateral surface.

11. A method according to claim 10, wherein said anodizing step includes colorization of said anodized lateral surface.

12. A method according to claim 1, wherein said connecting step comprises:
applying an adhesive to at least one outward facing surface of the metal core layer, or at least one inward facing surface of the first metal cladding layer or second metal cladding layer.

13. A method according to claim 1, wherein said connecting step comprises:
utilizing a plating process.

14. A method according claim 1, wherein said first density value is at least 5.0 times greater than said second density value.

15. A method according to claim 1, further comprising:
coating an outer facing lateral surface of the metal-clad core on said one side of the metal-clad core.

16. A method according to claim 15, said defining step comprising:
ink jet printing said visible indicium indicative of an account after said coating step.

17. A method according to claim 15, said defining step comprising:
etching said visible indicium indicative of an account after said coating step.

18. A method according to claim 1, wherein a total weight of the metal core layer is at least 50% of a total weight of the transaction card.

19. A method according to claim 1, wherein said first density value is at least 7 g/cm$^3$.

20. A method according to claim 1, wherein said metal core layer comprises a metal from the following group: tungsten, stainless steel, copper, silver, gold, or alloys comprising one or more of such metals; and,
wherein at least one of the first metal cladding layer and second metal cladding layer comprises at least one metal from the following group: aluminum, titanium, zinc, niobium, tantalum, or alloys comprising one or more of such metals.

* * * * *